United States Patent [19]

Kishi et al.

[11] Patent Number: 4,654,651
[45] Date of Patent: Mar. 31, 1987

[54] IMAGE DISPLAY METHOD

[75] Inventors: Hajimu Kishi; Kunio Tanaka; Takashi Takegahara, all of Tokyo, Japan

[73] Assignee: Fanuc Ltd, Minamitsuru, Japan

[21] Appl. No.: 672,254

[22] PCT Filed: Mar. 19, 1984

[86] PCT No.: PCT/JP84/00116
§ 371 Date: Oct. 24, 1984
§ 102(e) Date: Oct. 24, 1984

[87] PCT Pub. No.: WO84/03787
PCT Pub. Date: Sep. 27, 1984

[30] Foreign Application Priority Data

Mar. 23, 1983 [JP] Japan .................................. 58-48465

[51] Int. Cl.[4] .............................................. G09G 1/06
[52] U.S. Cl. ..................................... 340/731; 340/724
[58] Field of Search ............... 340/709, 723, 724, 727, 340/731, 747, 734, 995

[56] References Cited

U.S. PATENT DOCUMENTS 4,127,849 11/1978 Okor ................................. 340/731 X
4,197,590 4/1980 Sukonick et al. ................. 340/731 X
4,400,780 8/1983 Nagao et al. ..................... 340/731 X
4,503,427 3/1985 Iida ................................... 340/709 X
4,543,571 9/1985 Bilbrey et al. .................... 340/709 X
4,546,349 10/1985 Prohofsky et al. ............... 340/724 X Primary Examiner—Gerald L. Brigance
Assistant Examiner—Vincent P. Kovalick
Attorney, Agent, or Firm—Staas & Halsey

[57] ABSTRACT

An image display method in which an image (IMG) to be presented is displayed on a CRT display screen (DFS), which method has steps of entering a horizontal dimension ($L_x$) and a vertical dimension ($L_y$) of the image to be presented; obtaining a magnification K by using lengths ($B_x$, $B_y$) in the horizontal and vertical directions of the display screen as well as the dimensions $L_x$, $L_y$; obtaining coordinate values ($X_s$, $Y_s$) of the starting point (DS') of the image to be presented following multiplication thereof by K; specifying starting point coordinate values ($X_s'$, $Y_s'$) of the image on the display screen; obtaining shift quantities $S_x$, $S_y$ in the horizontal and vertical directions by using the coordinate values ($X_s$, $Y_s$), ($X_s'$, $Y_s'$) of both starting points; and displaying the image (IMG) on the CRT display screen (DFS) by using the magnification K and the shift quantities $S_x$, $S_y$.

6 Claims, 4 Drawing Figures

IMAGE DISPLAY METHOD

BACKGROUND OF THE INVENTION

This invention relates to an image display method; and more particularly, to an image display method whereby an image to be depicted on the display screen of a CRT (cathode-ray tube) is enlarged or reduced for full display.

Graphic display units are in use everywhere as means for implementing CAD/CAM (computed aided design and computer aided manufacturing). For example, a graphic display unit may be utilized effectively as means for checking an NC machining program by instantaneously displaying the tool trajectory of an NC machine tool or the like or the shape to machined. When an image is to be displayed by a graphic display unit of this kind, it is essential that the unit have a function for displaying the image on the CRT display screen in full following enlargement or reduction.

With conventional methods, however, the image to be presented cannot be displayed in full on the display screen through a simple operation following enlargement or reduction.

SUMMARY OF THE INVENTION

An object of the present invention is to provide an image display method whereby an image to be presented can be displayed in full on a display screen through a simple operation.

Another object of the present invention is to provide an image display method whereby an image to be presented can be displayed in full on a display screen following enlargement or reduction merely by entering horizontal and vertical dimensions of the image and specifying the starting point of the image on the display screen.

The present invention provides an image display method whereby an image to be presented can be displayed in full on a CRT display screen following enlargement or reduction by entering a horizontal dimension $L_x$ and a vertical dimension $L_y$ of the image to be presented; obtaining a magnification K by using lengths $B_x$, $B_y$ in the horizontal and vertical directions of the display screen as well as the dimensions $L_x$, $L_y$; obtaining the starting point coordinates ($X_s$, $Y_s$) of the image to be presented following multiplication thereof by K; obtaining the starting point coordinates ($X_s'$, $Y_s'$) of the image on the display screen by positioning a cursor at the starting point of the image on the display screen; obtaining shift quantities $S_x$, $S_y$ in the horizontal and vertical directions by using ($X_s$, $Y_s$) and ($X_s'$, $Y_s'$); and displaying the image on the CRT screen by using the magnification and the shift quantities. According to the present invention, an image to be presented can be displayed on a display screen in full following enlargement or reduction merely by entering the horizontal and vertical dimensions of the image and specifying the starting point of the image to be depicted on the display screen.

DESCRIPTION OF THE PREFERRED EMBODIMENT

Figure 1:
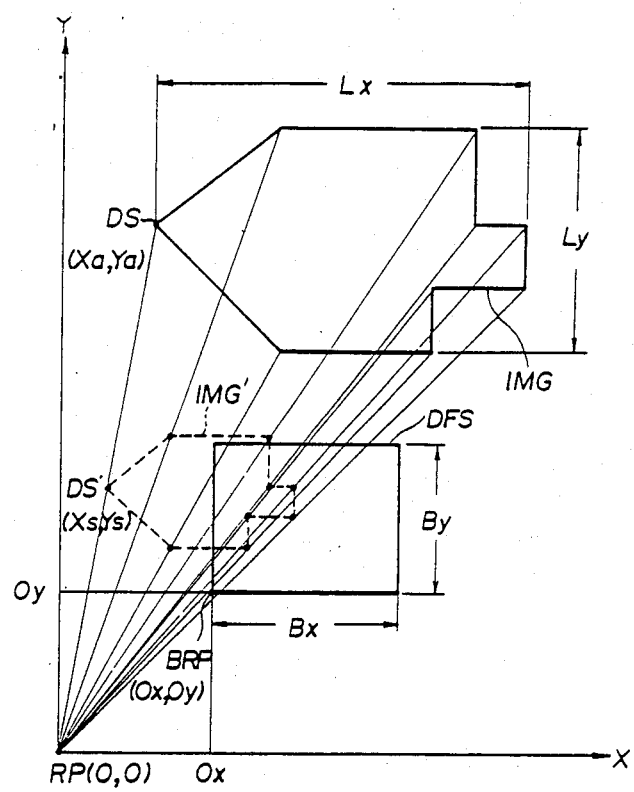
FIGS. 1 and 2 are schematic views for illustrating the image display method according to the present invention.
Figure 2:
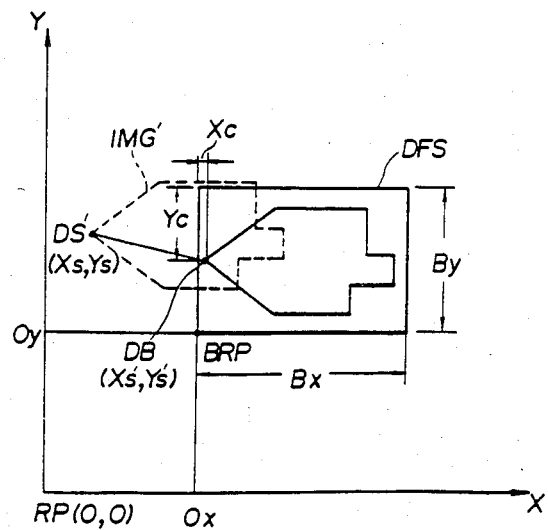

FIGS. 1 and 2 are schematic views for illustrating the image display method according to the present invention. In the Figures, DFS represents the CRT screen (display screen) of a graphic display unit, RP denotes the origin, having coordinates (O,O), of an image to be presented, BRP designates the origin, having coordinates ($O_x$,$O_y$), of the display screen of the CRT, IMG represents the graphic image to be presented, and DS stands for the starting point of the graphic image to be presented.

Let us assume that the graphic image to be presented is to be displayed in full on the display screen DFS. According to the present invention, this is carried out by enlarging or reducing the graphic image IMG by applying a suitable magnification; shifting the enlarged or reduced graphic image IMG' by suitable amounts in the horizontal and vertical directions; and subjecting the picture information indicative of the grapic image to be displayed to transformation processing in such a manner that the enlarged or reduced graphic image IMG' is made to fit the display screen DFS. In other words, according to the present invention, an image to be presented is displayed in full on a display screen by a three-step process. Specifically, (a) when the graphic image IMG which is to be displayed (FIG. 1) has been enlarged or reduced (reduced in the example of FIG. 1) by a predetermined magnification with the origin RP serving as a reference point, a magnification K is obtained as will fit the reduced grapic image IMG' (indicated by the dotted line in FIG. 1) onto the display screen DFS, (b) shift quantities $S_x$, $S_y$ necessary for fitting the reduced graphic image IMG' (indicated by the dotted line in FIG. 2) onto the display screen DFS are obtained to shift the graphic image IMG' in the horizontal and vertical directions, and (c) tne X and Y coordinates (x,y) of the picture information specifying the graphic image IMG to be displayed are transformed into coordinates (x',y') by the following equation:

$$\begin{pmatrix} x' \\ y' \end{pmatrix} = \begin{pmatrix} K \cdot x + S_x \\ K \cdot y + S_y \end{pmatrix}$$

and (x',y') are used to generate a display graphic image.

Figure 3:
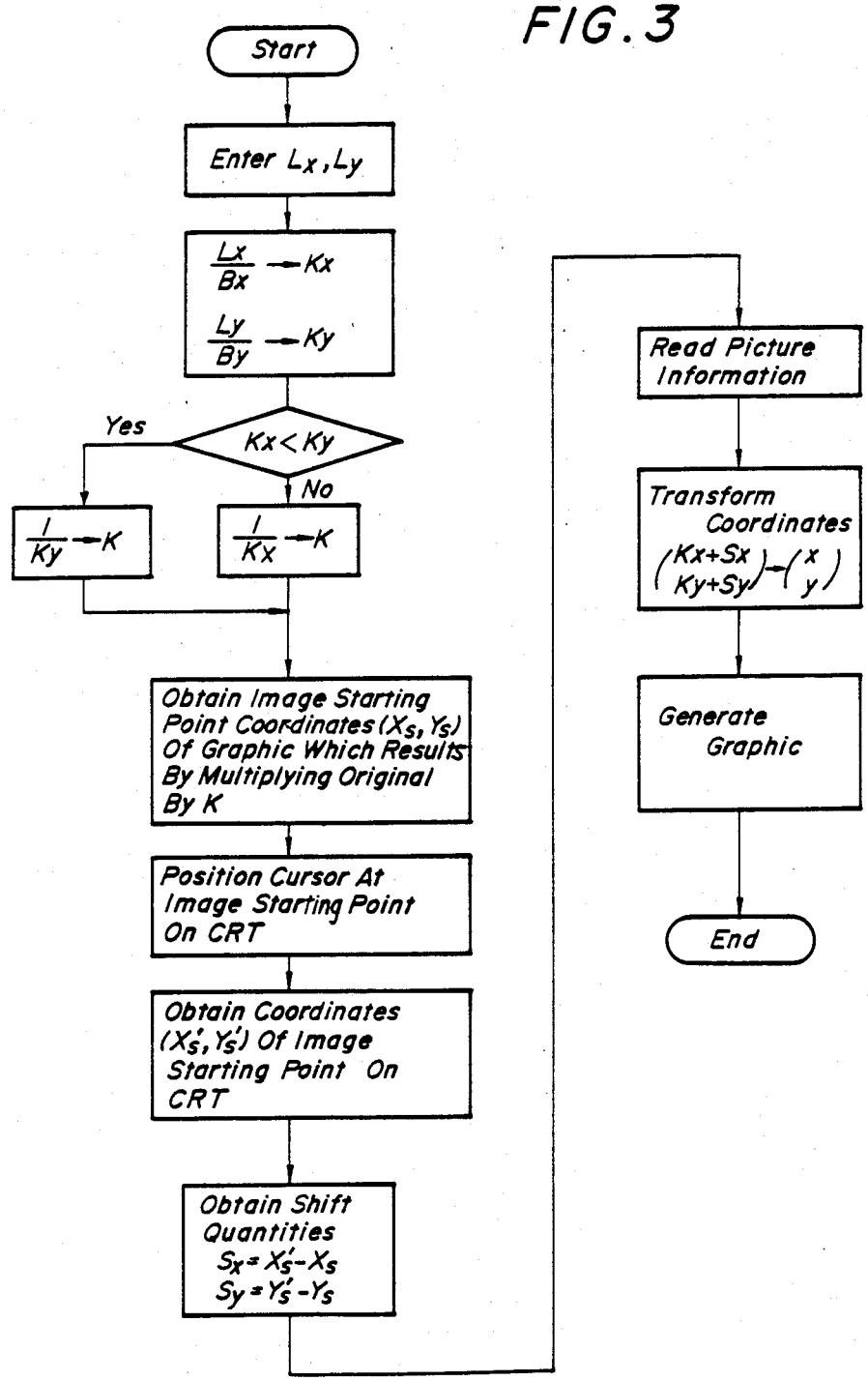
FIG. 3 is a flowchart of the image display method according to the present invention.
Figure 4:
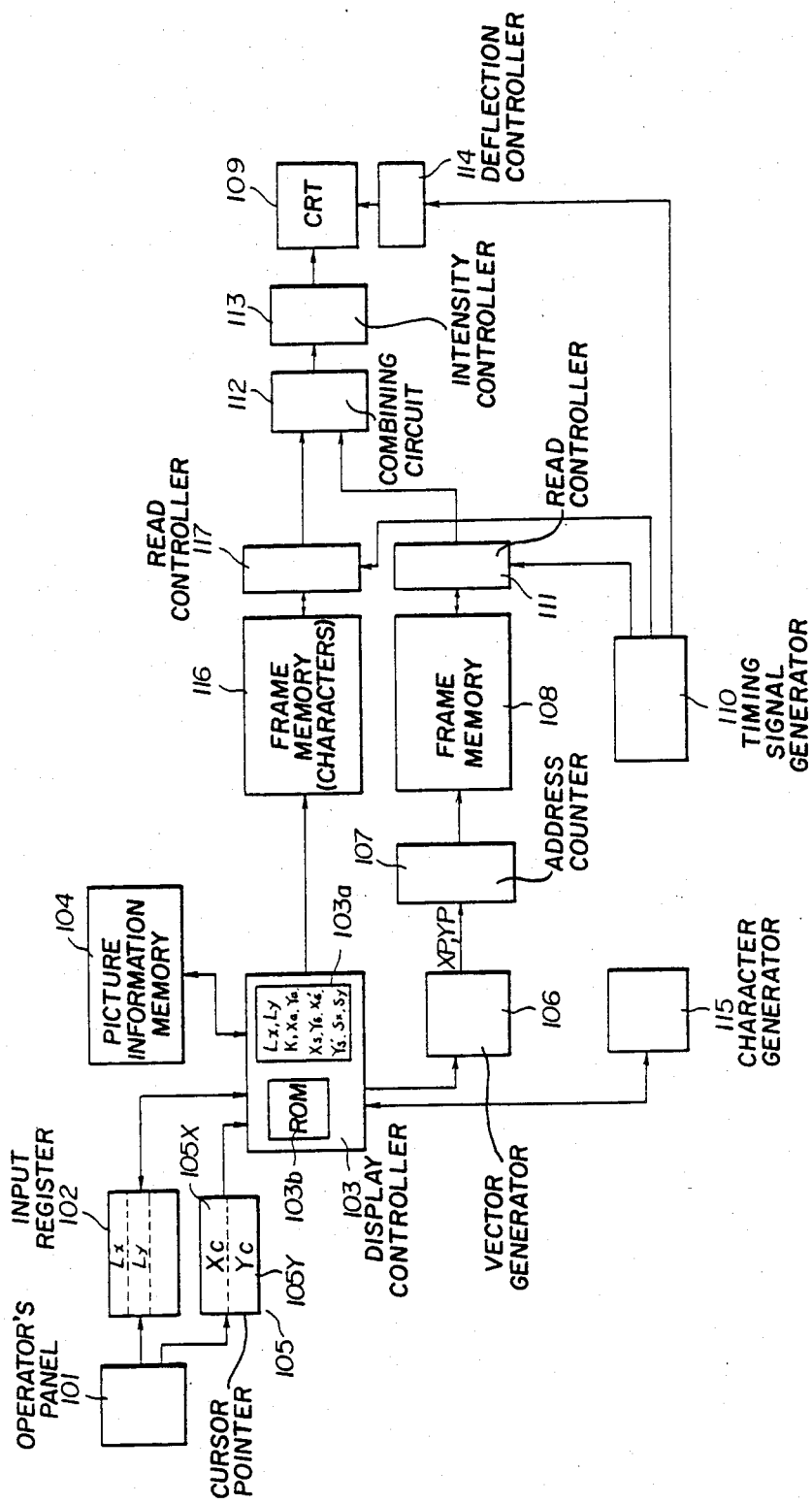
FIG. 4 is a block diagram of circuitry for practicing the image display method according to the present invention.

FIG. 3 if a flowchart of an image display method according to the present invention, and FIG. 4 is a block diagram of a circuit for practicing the image display method of the present invention.

(a) First, horizontal and vertical dimensions $L_x$, $L_y$ of the graphic image which is desired to be presented are entered by operating a key located on an operator's panel 101. It should be noted that $L_x$, $L_y$ are each set in an input register 102. Next, an entry key, not shown, is pressed, whereupon a display controller 103 of microcomputer construction reads the horizontal and vertical dimensions $L_x$, $L_y$ out of the input register 102 and stores them in an internal RAM 103a.

(b) Thereafter, under the control of a control program which has been stored in an internal ROM 103b, the display controller 103 obtains a horizontal magnification $K_x$ and a vertical magnification $K_y$ by performing the following computations:

$$\frac{L_x}{B_x} \to K_x \quad (1)$$

$$\frac{L_y}{B_y} \to K_y \quad (2)$$

In expressions (1) and (2), $B_x$, $B_y$ represent the horizonal and vertical dimensions, respectively, both of which are known, of the CRT display screen DFS.

(c) The magnitudes of $K_x$, $K_y$ are then compared. If $K_x < K_y$ holds, $1/K_y$ is treated as the magnification K; if $K_x \geq K_y$ holds, then $1/K_x$ is treated as K. It should be noted that a horizontal magnification $K_x'$ and a vertical magnification $K_y'$ can be obtained by performing the following computations instead of those indicated by expressions (1) and (2):

$$\frac{B_x}{L_x} \to K_x' \quad (1)'$$

$$\frac{B_y}{L_y} \to K_y' \quad (2)'$$

If $K_x' < K_y'$ holds, $K_x'$ is treated as the magnification K; if $K_x' \geq K_y'$ holds, then $K_y'$ is treated as K.

(d) The display controller 103 then reads the picture information indicative of the graphic image IMG, which has already been stored in a picture information memory 104, obtains the positional coordinates $(X_a, Y_a)$ of the image starting point DS (FIG. 1), and subsequently obtains, from the following expressions, the positional coordinates $(X_s, Y_s)$ of the starting point DS' of the enlarged or reduced graphic image IMG' obtained by multiplying the graphic image IMG by the magnification K:

$$K \cdot X_a \to X_s \quad (3)$$

$$K \cdot Y_a \to Y_s \quad (4)$$

(e) Next, a cursor shift key, not shown, located on the operator's panel 101 is operated to position a cursor at a prescribed point DB (FIG. 2) on the display screen DFS, followed by pressing an input key. When this is done, the point DB becomes the image starting point $(X_s', Y_s')$ on the display screen. This is a position for the purpose of displaying the starting point DS' of the graphic image IMG'. It should be noted that the cursor shift keys include $+X$, $-X$, $+Y$ and $-Y$ cursor keys. The status $X_c$ of an X register 105X in a cursor pointer 105 is incremented by one count each time the $+X$ cursor key is pressed. If this key is held depressed, the status $X_c$ of the X register 105X of the cursor pointer 105 will be incremented by one count at predetermined time intervals. The status of the X register 105X is decremented by one count in similar fashion each time the $-X$ cursor key is pressed, or when the key is held depressed. The status of a Y register 105Y in the cursor pointer 105 is incremented by one count in a similar fashion each time the $+Y$ cursor key is pressed or when the key is held depressed. The status of the Y register 105Y is decremented by one count in a similar fashion each time the $-Y$ cursor key is pressed, or when the key is held depressed. The display controller 103 reads the cursor position information $(X_c, Y_c)$ out of the cursor pointer 105 sequentially and displays the information on the CRT screen. When the input key is pressed after the cursor has been positioned at the image starting point DB, the display controller 103 recognizes the cursor position $(X_c, Y_c)$, which is being designated by the cursor pointer 105 at this time, as the positional coordinates $(X_s', Y_s')$ of the image starting point DB on the CRT display screeen DFS.

(f) Thereafter, computations based on the following expressions are performed to calculate the shift quantities $S_x$, $S_y$ for shifting the image starting point DS' $(X_s, Y_s)$ of the reduced or enlarged graphic image IMG' into coincidence with the image starting point DB $(X_s', Y_s')$ on the display screen DFS:

$$X_s' - X_s \to S_x \quad (5)$$

$$Y_s' - Y_s \to S_y \quad (6)$$

(g) When the calculation of the shift quantities $S_x$, $S_y$ ends, the display controller 103 thenceforth reads the picture information out of the picture information memory 104 in successive fashion. If the picture information read is vector information, the controller transforms data x, y indicating the position along the X and Y axes into x', y' by using the following expression:

$$\begin{pmatrix} K \cdot x + S_x \\ K \cdot y + S_y \end{pmatrix} \to \begin{pmatrix} x' \\ y' \end{pmatrix} \quad (7)$$

The controller delivers (x',y'), which are obtained by the foregoing transformation, to a vector generator 106. The vector generator 106 uses the picture information input to perform an ordinary linear or circular interpolation calculation, thus to generate interpolated pulses XP, YP along the respective axes, which pulses are applied to an address counter 107. The latter has two address counters, one for the X and the other for the Y axis. These count the interpolated pulses along the respective axes and write a "1" into a storage location of a frame memory 108 which is designated by the X- and Y-axis address counters each time. The frame memory 108 is of matrix construction and has one-bit storage locations corresponding to the pixel positions of the cathode-ray tube display screen. Each time an interpolation pulse is generated, a "1" is written into a storage location at a matrix cross point designated by the X-and Y-axis address counters. When a graphic has been stored in the frame memory 108 by the foregoing processing, the stored information is subsequently read out of the frame memory 108 in synchronism with the deflection of the CRT beam (this is referred to as raster scanning), and intensity modulation is performed using the stored information to display the graphic image on a cathode-ray tube 109. It should be noted that a timing signal generator 110 produces a timing signal for reading the stored information out of the frame memory 108, and a timing signal for deflecting the beam. A read controller 111 reads the stored information out of the frame memory 108 on the basis of the timing signal and applies the stored information to an intensity controller 113 via a combining circuit 112. The intensity controller 113 performs intensity modulation based on the stored information. A deflection controller 114 deflects the beam horizontally and vertically in synchronism with the timing signal.

If the picture information read out of the picture information memory 104 is a character code, the display controller 103 reads the character pattern indicated by the character code out of a character generator 115 and stores the pattern in a frame memory 116 for character pattern storage. Thereafter, a read controller 117 sequentially reads the stored information out of the frame memory 116 in synchronism with a timing signal produced by the timing signal generator 110. The combining circuit 112 combines this information with the signal read out of the frame memory 108 and applies the result to the intensity controller 113 to undergo intensity modulation.

The methods of displaying the cursor are well-known and will not be described in detail. Methods which are available, however, include: (1) a first method of reading a cursor pattern out of the character generator 115; storing the cursor pattern at a prescribed location of the frame memory 116 indicated by the cursor pointer 105; and reading out the stored information to display the same; (2) a second method of generating a cursor pattern through a technique similar to that used for vector generation; and (3) a third method of creating a cursor display area by using the contents $X_c$, $Y_c$ of the cursor pointer and, when the beam arrives at the cursor display area, applying an intensity control signal to the intensity controller 113 to display the same.

The foregoing description relates to a case where the image starting point DB on the CRT screen is designated by using a cursor. However, the present invention is not limited to such case, for an arrangement is permissible in which the image starting point DB is designated by using a light pen or keyboard.

According to the present invention, an image to be presented can be displayed in full on a display screen in a simple manner merely by entering horizontal and vertical dimensions of the image and designating the starting point of the image on the display screen by, e.g., a cursor. The present invention is therefore useful for application to a display unit.

We claim:

1. An image display method in which an image to be presented is displayed on an apparatus having a CRT display screen and memory means for storing data, said method comprising the steps of:
   (a) entering into the memory means, picture information defining the image to presented;
   (b) entering into the memory means, a horizontal dimension $L_x$ and a vertical dimension $L_y$ of the image to be presented;
   (c) storing lengths $B_x$, $B_y$ of the horizontal and vertical direction of the display screen in the memory means said lengths corresponding to a display area in said memory means;
   (d) calculating a magnification K based upon said lengths $B_x$, $B_y$ as well as said dimensions $L_x$, $L_y$;
   (e) multiplying said picture information defining the image to be presented by the magnification factor K;
   (f) obtaining starting point coordinate values ($X_s$, $Y_s$) within said memory means of the image to be presented following multiplication thereof by K;
   (g) specifying starting point coordinate values ($X_s'$, $Y_s'$) within said display area of said memory means of the desired location of the image on the display screen;
   (h) calculating shift quantities $S_x$, $S_y$ for the horizontal and vertical directions based upon the coordinate values ($X_s$, $Y_s$), ($X_s'$, $Y_s'$) of both starting points; and
   (i) displaying the complete image on the CRT display screen by using said picture information, said starting point coordinate values, said magnification factor and the shift quantities.

2. An image display method according to claim 1, wherein said starting oint coordinate values ($X_s'$, $Y_s'$) are specified by positioning a cursor at the starting point coordinate values of the desired location of the image on the display screen.

3. An image display method according to claim 1, wherein said picture information defining the image to be presented includes starting point coordinate values ($X_a$, $Y_a$) of the image to be presented, and wherein the starting point coordinate values ($X_s$, $Y_s$) of the image to be presented following multiplication thereof by K are calculated by performing the operations $K \cdot X_a = X_s$, $K \cdot Y_a = Y_s$.

4. An image display method according to claim 1, wherein step (d) includes the substeps of:
   calculating $K_x = B_x/L_x$, and $K_y = B_y/L_y$;
   comparing the magnitudes of $K_x$ and $K_y$; and
   defining the smaller of these numerical values as the magnification K.

5. An image display method according to claim 1, wherein step (d) includes the substeps of:
   calculating $K_x = L_x/B_x$, and $K_y = L_y/B_y$;
   comparing the magnitudes of $K_x$ and $K_y$; and
   defining the reciprocal of the larger of these numerical values as the magnification K.

6. An image display method according to claim 1, wherein step (f) includes the substep of calculating the shift quantities $S_x$, $S_y$ by performing the following operations:

$$S_x = X_s - X_s'$$

$$S_y = Y_s - Y_s'$$

and wherein step (g) includes the substep of generating the image to be presented, which is displayed on the CRT, based upon (x',y') obtained through transformation of X, Y coordinates (x, y) includes in the picture information defining the image to be presented, in accordance with the following equations:

$$\begin{pmatrix} x' \\ y' \end{pmatrix} = \begin{pmatrix} K \cdot x + S_x \\ K \cdot y + S_y \end{pmatrix}.$$

* * * * *

UNITED STATES PATENT AND TRADEMARK OFFICE
CERTIFICATE OF CORRECTION

PATENT NO. : 4,654,651

DATED : March 31, 1987

INVENTOR(S) : Kishi et al.

It is certified that error appears in the above-identified patent and that said Letters Patent is hereby corrected as shown below:

Col. 2, line 42, "tne" should be --the--.

Col. 6, line 17, "oint" should be --point--.

Signed and Sealed this

Eighth Day of September, 1987

Attest:

DONALD J. QUIGG

*Attesting Officer*  *Commissioner of Patents and Trademarks*